I. JAMES.
SPRING TIRE.
APPLICATION FILED OCT. 6, 1916.
1,232,320.
Patented July 3, 1917.
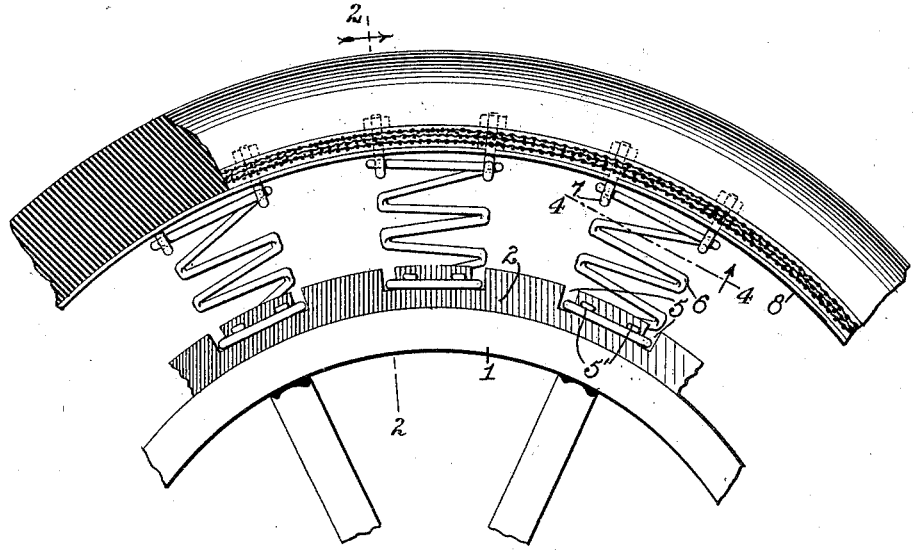
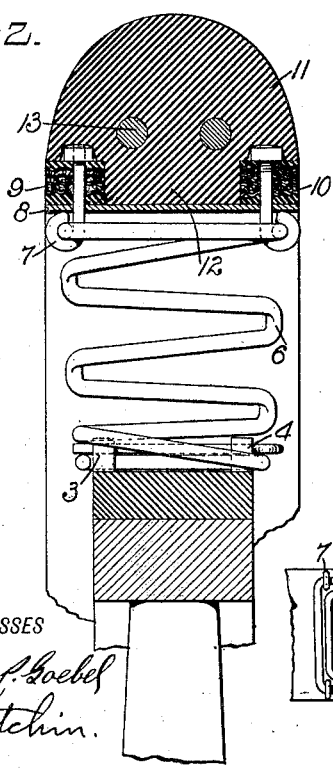
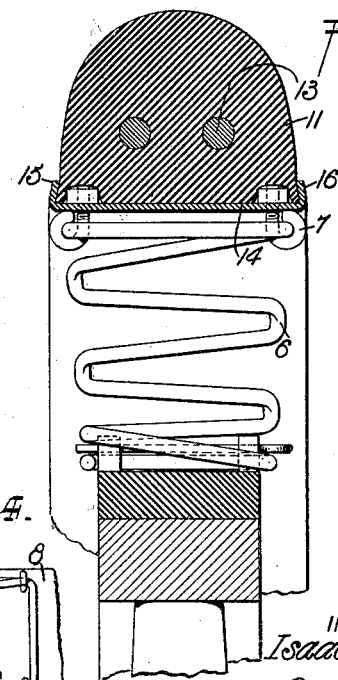
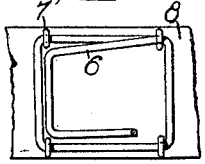
WITNESSES
INVENTOR
Isaac James
BY
ATTORNEYS

UNITED STATES PATENT OFFICE.

ISAAC JAMES, OF SCRANTON, PENNSYLVANIA.

SPRING-TIRE.

1,232,320.  Specification of Letters Patent.  Patented July 3, 1917.

Application filed October 6, 1916. Serial No. 124,039.

*To all whom it may concern:*

Be it known that I, ISAAC JAMES, a citizen of the United States, and a resident of Scranton, in the county of Lackawanna and State of Pennsylvania, have invented a new and Improved Spring-Tire, of which the following is a full, clear, and exact description.

This invention relates to tires and particularly to a spring tire and has for an object the provision of an improved arrangement of parts whereby the effect of a pneumatic tire is secured while presenting a strong and comparatively cheap construction.

Another object in view is to provide a tire formed with an inner stiff ring, outer flexible members and springs arranged therebetween for taking up the shock when the device is in use.

A still further object in view is to provide a tire which may be used on any desired form of wheel, the same being formed with a plurality of springs square in cross section and connected at a plurality of points at each end so as to firmly hold the outer resilient part of the tire in proper position while allowing a free resilient action.

In the accompanying drawing:

Figure 1 is a side view with certain parts broken away, of a segment of a tire embodying the invention, part of the wheel being shown in connection therewith.

Fig. 2 is a section through Fig. 1 on line 2—2.

Fig. 3 is a sectional view similar to Fig. 2 through a slightly modified form of the invention.

Fig. 4 is a detail sectional view through Fig. 1 on line 4—4.

Referring to the accompanying drawing by numerals, 1 indicates a wheel of any desired kind on which is secured in any suitable manner a rim or stiff ring 2 which is provided with upstanding flanges 3 and 4 in which sets of notches 5 are provided for receiving the ends of the respective springs 6. The springs are preferably square in cross section so that one end may pass through the notches 5 in both of the flanges and the upper end may readily accommodate four eyebolts 7, there being one eyebolt for each corner of the spring. As shown in Fig. 2, the eyebolts are arranged on each side and clamp the spring to a resilient metal ring 8, which ring is preferably comparatively thin so as to cause practically all of the strain to be transmitted to the spring.

Arranged on the ring 8 are strips 9 and 10, the same being formed of fiber impregnated with rubber, somewhat on the nature of an ordinary pneumatic casing, the various eyebolts 7 passing through these strips. The rubber covering member or tire 11, provided with a central reduced part 12, is arranged so as to cover the outer end of the eyebolts and the strips 9 and 10, while the reduced part 12 fits between said strips and is held in place thereby, the same being assisted by the usual metal members 13. It is evident that the springs 6 can be arranged close together or far apart, and may be made of any strength so as to be used with any desired load.

By the use of the square construction of spring a proper resilient action is produced and also a resilient resistance is produced to any side movement, thus simulating to a large extent the action of an ordinary pneumatic tire. Also by providing the resilient comparatively thin wearing ring 8 the outer surface or periphery of the tire structure will give or become indented when striking an obstruction in a similar manner to a pneumatic tire, thus taking up the shock locally rather than transmitting the shock from one place to another. In arranging the springs 6 in position they may be spaced any suitable distance apart and may be secured in the notches 5 in any suitable way, preferably by having the cotter pins 5′ extend through suitable apertures in the flanges 3 and 4 and presenting stops for limiting the movement of the springs in one direction.

In Fig. 3 will be seen a slightly modified form of the invention in which a ring 14 substantially U-shaped in cross section is provided instead of the flat ring 8. By providing the flanges 15 and 16 on ring 14 the eyebolts 7 may be clamped directly thereto and the tire 11 held in place in the usual manner by the metal members 13.

What I claim is:

1. A spring tire comprising a stiff ring having a pair of upstanding flanges formed with sets of notches therein, a spring fitted into each set of notches, a plurality of cotter pins for each spring extending through said flanges and engaging the springs for preventing their removal from said notches, a resilient ring connected to the outer ends of said springs, and a cushion member mounted on said last mentioned ring.

2. A spring tire comprising a stiff inner ring, a resilient outer ring, a plurality of radially extending springs arranged between said rings and connected thereto, a comparatively flexible strip mounted on each edge of said resilient ring, bolts extending through said strips and said flexible ring and engaging said springs for holding the springs in place and also said strips, and a cushion member provided with a depending central portion fitting between said strips.

ISAAC JAMES.